(12) United States Patent
Kim et al.

(10) Patent No.: US 8,953,126 B2
(45) Date of Patent: Feb. 10, 2015

(54) LIQUID CRYSTAL DISPLAY

(75) Inventors: Jong-Seong Kim, Seoul (KR);
Nam-Seok Roh, Seongnam-si (KR);
Sang-Il Kim, Yongin-si (KR); Woo-Jae Lee, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 645 days.

(21) Appl. No.: 12/767,388

(22) Filed: Apr. 26, 2010

(65) Prior Publication Data

US 2011/0069262 A1    Mar. 24, 2011

(30) Foreign Application Priority Data

Sep. 23, 2009 (KR) .................. 10-2009-0090259

(51) Int. Cl.
*G02F 1/1335* (2006.01)
*G02F 1/133* (2006.01)
*G02F 1/1347* (2006.01)
*G02F 1/1345* (2006.01)

(52) U.S. Cl.
CPC .................... *G02F 1/13454* (2013.01)
USPC .................. 349/115; 349/73; 349/74

(58) Field of Classification Search
USPC .............. 349/115, 73–83
See application file for complete search history.

(56) References Cited

U.S. PATENT DOCUMENTS

| | | | | |
|---|---|---|---|---|
| 3,816,786 | A * | 6/1974 | Churchill et al. | 313/400 |
| 7,563,389 | B2 * | 7/2009 | Shukla et al. | 252/299.01 |
| 7,630,029 | B2 * | 12/2009 | Majumdar et al. | 349/86 |
| 7,898,625 | B2 * | 3/2011 | Hayashi et al. | 349/130 |
| 2005/0110925 | A1 | 5/2005 | Chari et al. | |
| 2005/0151887 | A1 | 7/2005 | Stephenson et al. | |
| 2005/0162606 | A1 | 7/2005 | Doane et al. | |
| 2005/0195354 | A1 * | 9/2005 | Doane et al. | 349/143 |
| 2008/0074383 | A1 * | 3/2008 | Dean | 345/156 |
| 2008/0170184 | A1 * | 7/2008 | Byun et al. | 349/97 |
| 2008/0212014 | A1 * | 9/2008 | Kwon et al. | 349/189 |
| 2008/0259262 | A1 * | 10/2008 | Jones et al. | 349/139 |
| 2009/0284691 | A1 * | 11/2009 | Marhefka et al. | 349/86 |

FOREIGN PATENT DOCUMENTS

| | | |
|---|---|---|
| JP | 09-068702 | 3/1997 |
| JP | 09-068717 | 3/1997 |
| JP | 2005-324995 | 11/2005 |
| JP | 2008-047450 | 2/2008 |
| KR | 1020060131551 | 12/2006 |
| KR | 1020070014065 | 1/2007 |
| KR | 1020070032461 | 3/2007 |
| KR | 1020080001678 | 1/2008 |
| KR | 1020080082811 | 9/2008 |

* cited by examiner

*Primary Examiner* — Charles Chang
(74) *Attorney, Agent, or Firm* — H.C. Park & Associates, PLC

(57) ABSTRACT

A liquid crystal display according to exemplary embodiments of the present invention includes a first panel including a first lower substrate, a first lower electrode formed on the first lower substrate, a first upper substrate facing the first lower substrate, a first upper electrode formed on the first upper substrate, and a first cholesteric liquid crystal injected between the first lower electrode and the first upper electrode, wherein the first lower electrode includes carbon nanotubes. The liquid crystal display including the first lower electrode made of the carbon nanotubes without a light absorption layer provides a simple structure capable of realizing a black state.

13 Claims, 4 Drawing Sheets

LIQUID CRYSTAL DISPLAY

CROSS-REFERENCE TO RELATED APPLICATION

This application claims priority from and the benefit of Korean Patent Application No. 10-2009-0090259 filed on Sep. 23, 2009, which is hereby incorporated by reference for all purposes as if fully set forth herein.

BACKGROUND OF THE INVENTION

1. Field of the Invention

Exemplary embodiments of the present invention relate to a liquid crystal display and method for manufacturing a liquid crystal display device.

2. Description of the Background

As currently popular flat panel displays, there are a liquid crystal display (LCD), a plasma display device (PDP), an organic light emitting device (OLED), a field effect display (FED), and an electrophoretic display device.

Among them, the liquid crystal display has been widely adopted as a monitor and a television, the plasma display device has been adopted as a large size television, and the organic electric field emissive display device has been adopted for a mobile phone display window, but various approaches have been applied to a medium sized display device and a large sized display device. For example, a research has been undertaken to apply the electric field effect display device or the electrophoretic display to a monitor, a television monitor, or a monitor for an electric paper.

Particularly, as for the electrophoretic display, the liquid crystal display using a cholesteric liquid crystal (LC) has been accepted as a display device applicable to the electric paper. However, the electrophoretic display has some drawbacks, for example, to realize full colors when red, green, and blue cholesteric LCs having different helical pitches are deposited in the cholesteric liquid crystal display. In this case, light of each color is selectively reflected or transmitted to realize the full colors. Accordingly, the full colors may not be realized without the usage of a polarizer and a color filter. As such, the cholesteric liquid crystal display has a bi-stability which rest in two states such that it has low power consumption compared with the other display devices, however an additional light absorption layer should be added to realize the black state that makes the structure complicated and increases its manufacturing costs.

Therefore, there is a need for an approach to reduce manufacturing costs by providing a simple structure of a liquid crystal display capable of realizing black state without using additional light absorption layer.

SUMMARY OF THE INVENTION

These and other needs are addressed by the present invention, in which exemplary embodiments provide to simplify a structure and to reduce manufacturing costs of a cholesteric liquid crystal display by forming an electrode as a carbon nanotube without using a light absorption layer.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a liquid crystal display. The liquid crystal display includes a first panel comprising a first lower substrate and a first upper substrate facing the lower substrate, a first lower electrode formed on the first lower substrate, a first upper electrode formed on the first upper substrate, and a first cholesteric liquid crystal injected between the first lower electrode and the first upper electrode. The first lower electrode comprises a carbon nanotube. The liquid crystal display also includes a second panel disposed on the first panel and comprising a second cholesteric liquid crystal and a third panel disposed on the second panel and comprising a third cholesteric liquid crystal. Helical pitches of the first cholesteric liquid crystal, the second cholesteric liquid crystal, and the third cholesteric liquid crystal are different from one another.

Exemplary embodiments of the present invention disclose a liquid crystal display. The liquid crystal display includes a lower substrate and an upper substrate facing each other. The liquid crystal display also includes a first lower electrode, a second lower electrode, and a third lower electrode formed on the lower substrate comprising carbon nanotubes. The liquid crystal display includes a first upper electrode, a second upper electrode, and a third upper electrode formed on the upper substrate. The liquid crystal display includes a first cholesteric liquid crystal interposed between the first lower electrode and the first upper electrode. The liquid crystal display includes a second cholesteric liquid crystal interposed between the second lower electrode and the second upper electrode. The liquid crystal display includes a third cholesteric liquid crystal interposed between the third lower electrode and the third upper electrode.

Exemplary embodiments of the present invention disclose a method for making a liquid crystal display. The method includes disposing a plurality of panels comprising a respective lower substrates and upper substrates facing respectively each other. The method also includes forming a plurality of lower electrodes, comprising carbon nanotubes, on the respective lower substrates and a plurality of upper electrodes on the respective upper substrates. The method includes interposing a plurality of cholesteric liquid crystals between the respective lower electrodes and the upper electrodes. Each helical pitches of the interposed cholesteric liquid crystals is different.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

A liquid crystal display and method of manufacturing a liquid crystal display are disclosed. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

It is understood that when an element such as a layer, a film, a region, or a substrate is referred to as being "on" an element, it can be directly on the element, over the element, or intervening elements may also be present. In contrast, when an element is referred to as being "directly on" another element, there are no intervening elements present.

Now, a liquid crystal display according to exemplary embodiments of the present invention is described with reference to FIG. 1.

Figure 1:
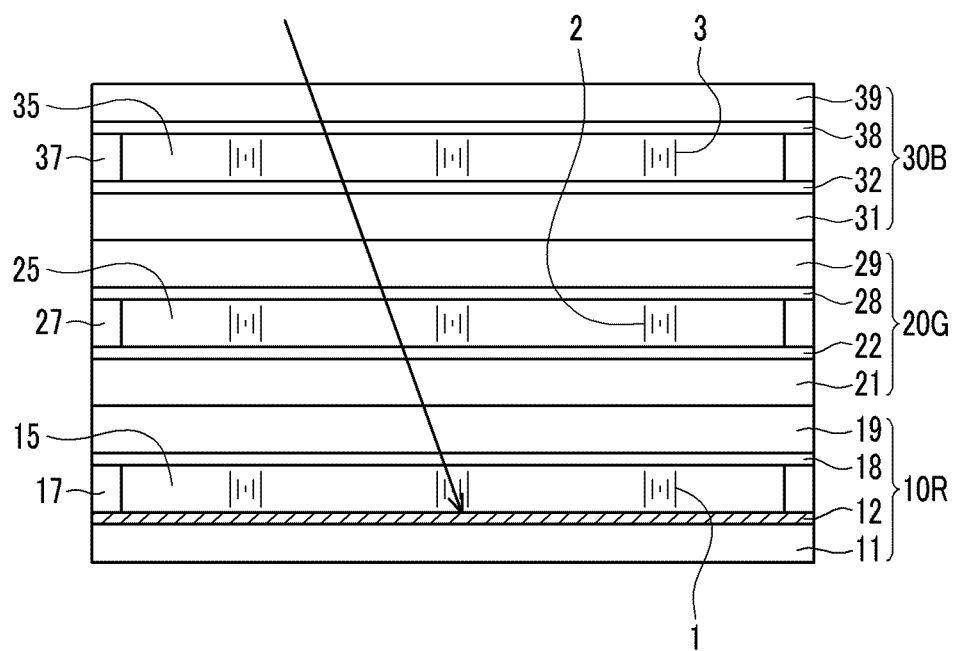
FIG. 1 is a cross-sectional view of a cholesteric liquid crystal display capable of realizing a black state, according to exemplary embodiments of the present invention.

FIG. 1 is a cross-sectional view of a cholesteric liquid crystal display capable of realizing a black state, according to exemplary embodiments of the present invention.

As shown in FIG. 1, in a liquid crystal display, a red panel 10R, a green panel 20G, and a blue panel 30B may sequentially be deposited.

The red panel 10R may include a first lower substrate 11 and a first upper substrate 19 facing each other, and a first cholesteric liquid crystal layer 15 interposed the two substrates 11 and 19. The first cholesteric liquid crystal layer 15 may be sealed by a first sealant 17. A first lower electrode 12 may be formed on the first lower substrate 11, and a first upper electrode 18 may be formed on the first upper substrate 19 such that an electric field may be generated between the first lower electrode 12 and the first upper electrode 18.

In some examples, the first lower substrate 11 and the first upper substrate 19 may be made of an insulation material such as a transparent glass or a plastic.

A first cholesteric liquid crystal 1 included in the first cholesteric liquid crystal layer 15 may be a red cholesteric liquid crystal having a helical pitch reflecting light of a wavelength approximately 590 nm to approximately 750 nm as a red wavelength.

The first lower electrode 12 may include carbon nanotubes (CNT), and provided to absorb external light as a light absorption layer. The first upper electrode 18 may include indium zinc oxide (IZO) or indium tin oxide (ITO) and thereby to transmit external light.

The green panel 20G disposed on the red panel 10R may include a second lower substrate 21 and a second upper substrate 29 facing each other, and a second cholesteric liquid crystal layer 25 interposed between the two substrates 21 and 29. The second cholesteric liquid crystal layer 25 can be sealed by a second sealant 27. A second lower electrode 22 may be formed on the second lower substrate 21, and a second upper electrode 28 may be formed on the second upper substrate 29 such that the electric field may be generated between the second lower electrode 22 and the second upper electrode 28.

A second cholesteric liquid crystal 2 included in the second cholesteric liquid crystal layer 25 can be a green cholesteric liquid crystal having a helical pitch reflecting light of a wavelength approximately 500 nm to approximately 560 nm as a green wavelength.

The second lower electrode 22 and the second upper electrode 28 as a transparent electrode may include IZO or ITO, and thereby to transmit external light therethrough.

The blue panel 30B disposed on the green panel 20G may include a third lower substrate 31 and a third upper substrate 39 facing each other, and a third cholesteric liquid crystal layer 35 interposed between the two substrates 31 and 39. The third cholesteric liquid crystal layer 35 can be sealed by a third sealant 37. A third lower electrode 32 may be formed on the third lower substrate 31, and a third upper electrode 38 may be formed on the third upper substrate 39 such that an electric field may be generated between the third lower electrode 32 and a third upper electrode 38.

A third cholesteric liquid crystal 3 included in the third cholesteric liquid crystal layer 35 may be a blue cholesteric liquid crystal having a helical pitch reflecting light of a wavelength approximately 400 nm to approximately 480 nm as a blue wavelength.

The third lower electrode 32 and the third upper electrode 38 may include IZO or ITO as the transparent electrode, and thereby to transmit external light therethrough.

The first cholesteric liquid crystal layer 15, the second cholesteric liquid crystal layer 25, and the third cholesteric liquid crystal layer 35 may have two stable planar states and a focal conic state, thereby maintaining two stable states when an arbitrary voltage is not applied. In the planar state, the first cholesteric liquid crystal 1, the second cholesteric liquid crystal 2, and the third cholesteric liquid crystal 3 may have the helical structure thereby to reflect the light of the particular wavelength according to the helical pitch. And in the focal conic state, the helical axis may be arranged in the direction parallel to the electrodes 12, 18, 22, 28, 32, and 38 such that light can be transmitted.

Next, an operation for realizing a black state by a liquid crystal display according to exemplary embodiments of the present invention is described with reference to FIG. 1.

As shown in FIG. 1, when a low voltage is applied between the first lower electrode 12 and the first upper electrode 18, the first cholesteric liquid crystal 1 may form the focal conic state. In some examples, when the low voltage is applied between the second lower electrode 22 and the second upper electrode 28, the second cholesteric liquid crystal 2 also may form the focal conic state. For example, when the low voltage is applied between the third lower electrode 32 and the third upper electrode 38, the third cholesteric liquid crystal 3 also may form the focal conic state. Accordingly, the external light may sequentially be transmitted through the third cholesteric liquid crystal layer 35, the second cholesteric liquid crystal layer 25, and the first cholesteric liquid crystal layer 15. The light passing through the first cholesteric liquid crystal layer 15 may be absorbed to the first lower electrode 12 including the carbon nanotubes. Accordingly, the liquid crystal display is capable of realizing a black state and changing from the black state.

As described above, instead of applying the additional light absorption layer to realize the black state, the first lower electrode 12 being made of the carbon nanotubes is provided to function as the light absorption layer such that the structure thereof may be simplified.

Figure 2:
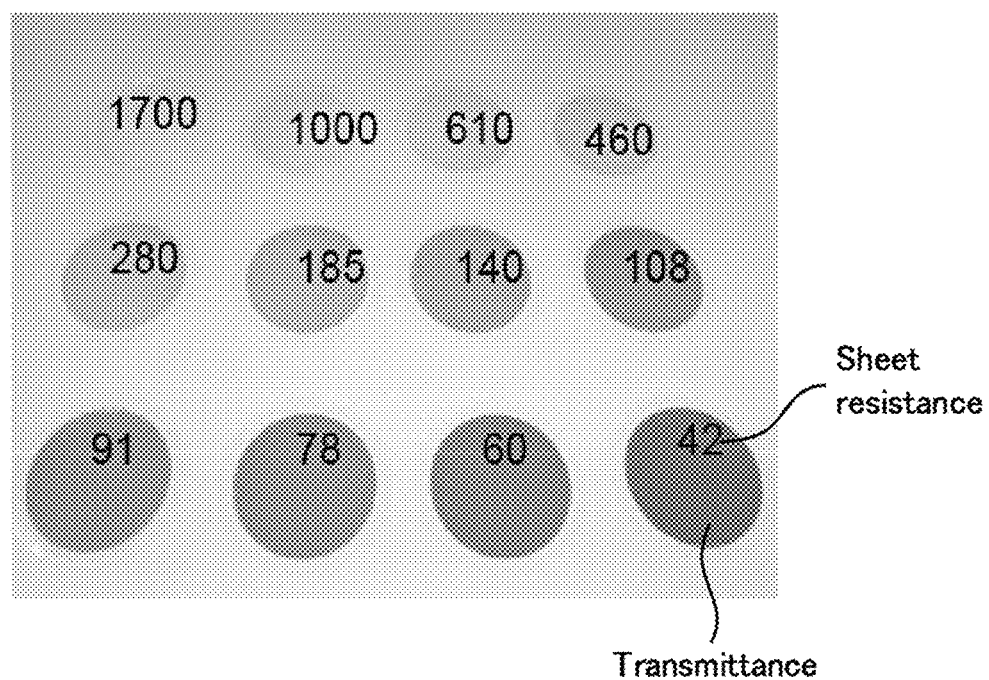
FIG. 2 is a view of a relationship between transmittance and sheet resistance of carbon nanotubes.

FIG. 2 is a view showing a relationship between transmittance and sheet resistance of carbon nanotubes.

As shown in FIG. 2, the transmittance and the sheet resistance of the carbon nanotubes may proportional to each other. That is, the sheet resistance can be decreased as the transmittance of the carbon nanotubes is reduced, thereby becoming dark. Particularly, when the sheet resistance of the carbon nanotubes is less than about 100 ohm/sq, the black state can be represented. Accordingly, it is contemplated that the transmittance of the first lower electrode 12 to use as the light absorption layer is in the range of about 1% to 60%, and the sheet resistance of the first lower electrode 12 is in the range of about 10 ohm/sq to 100 ohm/sq. When the sheet resistance of the first lower electrode 12 is more than about 100 ohm/sq, it is difficult to realize the black state, and the sheet resistance is too high to use it as the pixel electrode.

TABLE 1 shows the relationship between the sheet resistance of the transparent carbon nanotubes of more than about 100 ohm/sq and the sheet resistance of the black carbon nanotubes of less than about 100 ohm/sq, and the transmittance.

TABLE 1

|  | sheet resistance (ohm/sq) | sheet resistance (%) |
| --- | --- | --- |
| Black carbon nanotubes | 34 | 30 |
|  | 54.6 | 50 |
|  | 32 | 30 |
|  | 15 | 15 |
| Transparent carbon nanotubes | 366 | 70 |
|  | 331 | 85 |

As shown in TABLE 1, the black carbon nanotubes used as the first lower electrode 12 may have lower sheet resistance than the transparent carbon nanotubes such that there is a merit to drive the electrode. In this example, the sheet resistance value is lower than that of IZO or ITO that is typical material for a pixel electrode.

Also, different from IZO or ITO that is easily cracked while bending, the first lower electrode 12 made of the carbon nanotubes is flexible to bend such that the first lower electrode 12 made of the carbon nanotubes can easily be applied to the electric paper as a display device.

Next, an operation to realize a color by a liquid crystal display according to exemplary embodiments of the present invention is described with reference to FIG. 3 and FIG. 4.

Figure 3:
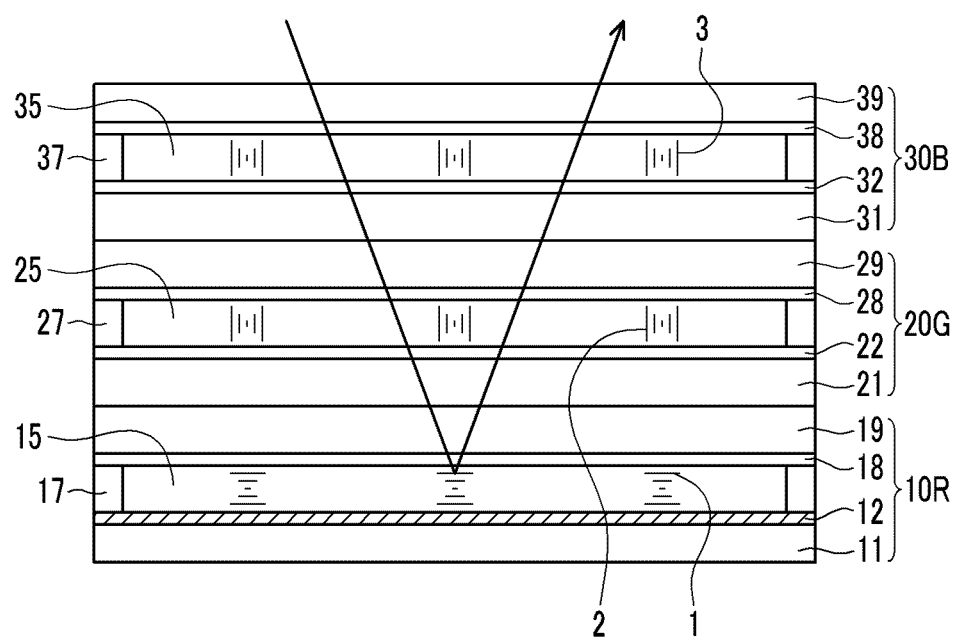
FIG. 3 is a cross-sectional view of a cholesteric liquid crystal display representing a red color, according to exemplary embodiments of the present invention.
Figure 4:
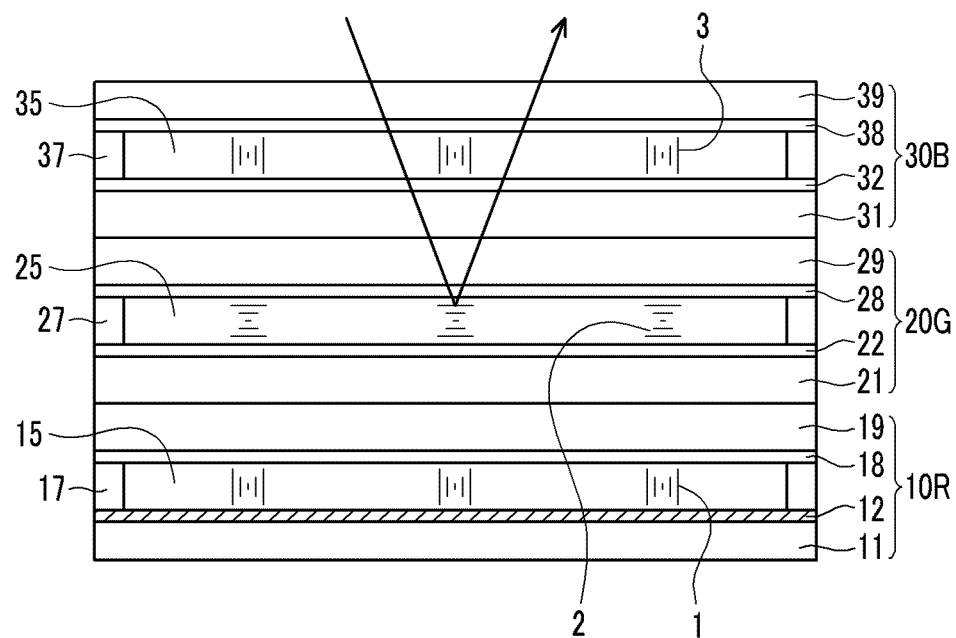
FIG. 4 is a cross-sectional view of a cholesteric liquid crystal display representing a green color, according to an exemplary embodiment of the present invention.

FIG. 3 is a cross-sectional view of a cholesteric liquid crystal display representing a red color, according to exemplary embodiments of the present invention and FIG. 4 is a cross-sectional view of a cholesteric liquid crystal display representing a green color, according to exemplary embodiments of the present invention.

As shown in FIG. 3, when the high voltage is applied between the first lower electrode 12 and the first upper electrode 18, the first cholesteric liquid crystal may form the planar state. The second cholesteric liquid crystal 2 may form the focal conic state by applying the low voltage between the second lower electrode 22 and the second upper electrode 28. And the third cholesteric liquid crystal 3 may form the focal conic state by applying the low voltage between the third lower electrode 32 and the third upper electrode 38.

Accordingly, the external light sequentially passes through the third cholesteric liquid crystal layer 35 and the second cholesteric liquid crystal layer 25. However, it is noted that in the first cholesteric liquid crystal layer 15, the light corresponding to a wavelength range of approximately 590 nm to approximately 750 nm is reflected by the first cholesteric liquid crystal having the helical pitch reflecting the light of approximately 590 nm to approximately 750 nm wavelength. Accordingly, the liquid crystal display can represent the red.

Also, as shown in FIG. 4, the low voltage may be applied between the first lower electrode 12 and the first upper electrode 18 such that the first cholesteric liquid crystal may form the focal conic state, the high voltage may be applied between the second lower electrode 22 and the second upper electrode 28 such that the second cholesteric liquid crystal 2 may form the planar state. And the low voltage may be applied between the third lower electrode 32 and the third upper electrode 38 such that the third cholesteric liquid crystal 3 may form the focal conic state.

Accordingly, the external light can transmit through the third cholesteric liquid crystal layer 35, and the second cholesteric liquid crystal layer 15, the light of approximately 500 nm to approximately 560 nm wavelength can be reflected by the first cholesteric liquid crystal having the helical pitch reflecting the light of approximately 500 nm to approximately 560 nm wavelength. Accordingly, the liquid crystal display can represent the green color.

As described above, the red panel, the green panel, and the blue panel can be deposited for realizing color, however the red, the green, and the blue cholesteric liquid crystals having the different helical pitches may be disposed on the same plane for realizing color.

Next, as exemplary embodiments, disposing the red, the green, and the blue cholesteric liquid crystals on the same plane is described.

Figure 5:
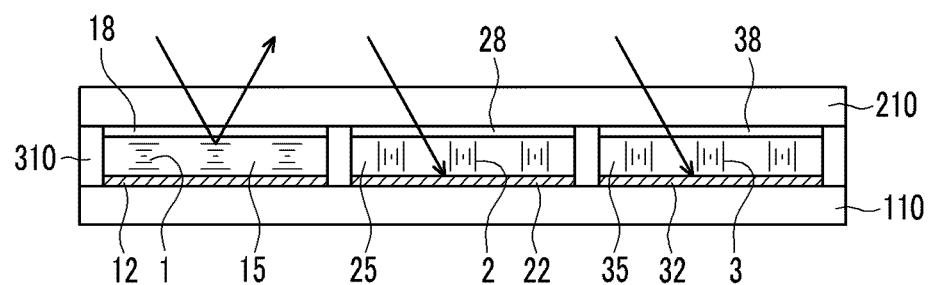
FIG. 5 is a cross-sectional view of a liquid crystal display, according to exemplary embodiments of the present invention.

FIG. 5 is a cross-sectional view of a liquid crystal display according to exemplary embodiments of the present invention.

As shown in FIG. 5, the liquid crystal display may include a lower substrate 110 and an upper substrate 210 facing each other, and cholesteric liquid crystal layers 15, 25, and 35 interposed between the two substrates 110 and 210. The first lower electrode 12, the second lower electrode 22, and the third lower electrode 32 may be disposed on the lower substrate 110 in the same plane, and the first upper electrode 18, the second upper electrode 28, and the third upper electrode 38 may be disposed on the upper substrate 210 in the same plane such that the electric field may be generated between the first lower electrode 12 and the first upper electrode 18, between the second lower electrode 22 and the second upper electrode 28, and between the third lower electrode 32 and the third upper electrode 38.

The lower substrate 110 and the upper substrate 210 can be made of the insulation material such as a transparent glass or a plastic.

The cholesteric liquid crystal layers 15, 25, and 35 may include the first cholesteric liquid crystal layer 15, the second cholesteric liquid crystal layer 25, and the third cholesteric liquid crystal layer 35, and may be sealed by a sealant 310. The first cholesteric liquid crystal layer 15 may include the red cholesteric liquid crystal 1 having the helical pitch reflecting the light of approximately 590 nm to approximately 750 nm wavelength for representing the red wavelength. The second cholesteric liquid crystal layer 25 may include the green cholesteric liquid crystal 2 having the helical pitch reflecting the light of approximately 500 nm to approximately 560 nm wavelength for representing the green wavelength, and the third cholesteric liquid crystal layer 35 may include the blue cholesteric liquid crystal 3 having the helical pitch reflecting the light of approximately 400 nm to approximately 480 nm wavelength for representing the blue wavelength.

The first lower electrode 12, the second lower electrode 22, and the third lower electrode 32 may include the carbon nanotubes, and function as the light absorption layers to absorb the external light. It is contemplated that the transmittance of the first lower electrode 12, the second lower electrode 22, and the third lower electrode 32 is in the range of about 1% to 60% to use them as the light absorption layers, and that the sheet resistance of the first lower electrode 12, the second lower electrode 22, and the third lower electrode 32 is in the range of about 10 ohm/sq to 100 ohm/sq. When the sheet resistance of the first lower electrode 12, the second lower electrode 22, and the third lower electrode 32 is more than about 100 ohm/sq, it is difficult to use them as the light absorption layers and the sheet resistance is too high to function as the pixel electrode.

The first upper electrode 18, the second upper electrode 28, and the third upper electrode 38 may include IZO or ITO to transmit the external light. As described above, instead of using the additional light absorption layer, the first lower electrode 12, the second lower electrode 22, and the third lower electrode 32 being made of the carbon nanotubes may function as the light absorption layer such that the structure thereof may be simplified.

Next, an operation for realizing the red color by a liquid crystal display according to exemplary embodiments of the present invention is described with reference to FIG. 5.

As shown in FIG. 5, the high voltage can be applied between the first lower electrode 12 and the first upper electrode 18 such that the first cholesteric liquid crystal 1 may form the planar state. The low voltage can be applied between the second lower electrode 22 and the second upper electrode 28 such that the second cholesteric liquid crystal 2 may form the focal conic state, and the low voltage can be applied between the third lower electrode 32 and the third upper electrode 38 such that the third cholesteric liquid crystal 3 may form the focal conic state.

Accordingly, the external light can be passed through the second cholesteric liquid crystal layer 25 and the third cholesteric liquid crystal layer 35 and can be absorbed by the second lower electrode 22 and the third lower electrode 32. However, it is noted that in the first cholesteric liquid crystal layer 15, the light of approximately 590 nm to approximately 750 nm wavelength can be reflected by the first cholesteric liquid crystal 1 having the helical pitch reflecting the light of approximately 590 nm to approximately 750 nm wavelength. Accordingly, the liquid crystal display can represent the red color.

A liquid crystal display according to exemplary embodiments of the present invention may include a first panel including a first lower substrate, a first lower electrode formed on the first lower substrate, a first upper substrate facing the first lower substrate, a first upper electrode formed on the first upper substrate. And a first cholesteric liquid crystal may be injected between the first lower electrode and the first upper electrode. The first lower electrode may include carbon nanotubes.

The sheet resistance of the first lower electrode may be in the range of about 10 ohm/sq to 100 ohm/sq.

The transmittance of the first lower electrode may be in the range of about 1% to 60%.

In some examples, a second panel disposed on the first panel and may include a second cholesteric liquid crystal, and a third panel disposed on the second panel and may include a third cholesteric liquid crystal may be further included, wherein helical pitches of the first cholesteric liquid crystal, the second cholesteric liquid crystal, and the third cholesteric liquid crystal may be different from each other.

In some examples, the first cholesteric liquid crystal may be a red cholesteric liquid crystal having a helical pitch reflecting the light of a red wavelength, the second cholesteric liquid crystal may be a green cholesteric liquid crystal having a helical pitch reflecting the light of a green wavelength, and the third cholesteric liquid crystal may be a blue cholesteric liquid crystal having a helical pitch reflecting the light of a blue wavelength.

The sheet resistance of the first lower electrode may be in the range of about 10 ohm/sq to 100 ohm/sq.

The first upper electrode may comprise IZO and ITO.

A liquid crystal display according to exemplary embodiments of the present invention may include a lower substrate, a first lower electrode, a second lower electrode, and a third lower electrode formed on the lower substrate, and may include carbon nanotubes, an upper substrate facing the lower substrate, a first upper electrode, a second upper electrode, and a third upper electrode formed on the upper substrate. A first cholesteric liquid crystal may be interposed between the first lower electrode and the first upper electrode. A second cholesteric liquid crystal may be interposed between the second lower electrode and the second upper electrode. And a third cholesteric liquid crystal may be interposed between the third lower electrode and the third upper electrode.

The first lower electrode, the second lower electrode, and the third lower electrode may be disposed on the same plane.

The sheet resistance of the first lower electrode, the second lower electrode, and the third lower electrode may be in the range of about 10 ohm/sq to 100 ohm/sq.

The transmittance of the first lower electrode, the second lower electrode, and the third lower electrode may be in the range of about 1% to 60%.

In some examples, the first cholesteric liquid crystal may be a red cholesteric liquid crystal having a helical pitch reflecting the light of a red wavelength, the second cholesteric liquid crystal may be a green cholesteric liquid crystal having a helical pitch reflecting the light of a green wavelength, and the third cholesteric liquid crystal may be a blue cholesteric liquid crystal having a helical pitch reflecting the light of a blue wavelength.

The sheet resistance of the first lower electrode, the second lower electrode, and the third lower electrode may be in the range of about 10 ohm/sq to 100 ohm/sq.

The first upper electrode, the second upper electrode, and the third upper electrode may comprise IZO and ITO.

According to exemplary embodiments of the present invention, the first lower electrode may be made of the carbon nanotubes without using the light absorption layer such that a simple structure may be obtained.

Also, the first lower electrode may be formed of the black carbon nanotubes such that sheet resistance may be reduced, and thereby there is a merit to drive electrode.

Also, the flexible carbon nanotubes may form the first lower electrode such that the electrode can easily be applied to the electric paper as a flexible display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A liquid crystal display, comprising:
a first panel comprising a first lower substrate and a first upper substrate facing the lower substrate, a first lower electrode formed on the first lower substrate, a first upper electrode formed on the first upper substrate, and a first cholesteric liquid crystal injected between the first lower electrode and the first upper electrode;

a second panel disposed on the first panel and comprising a second cholesteric liquid crystal; and a third panel disposed on the second panel and comprising a third cholesteric liquid crystal, wherein helical pitches of the first cholesteric liquid crystal, the second cholesteric liquid crystal, and the third cholesteric liquid crystal are different from one another wherein the first lower electrode comprises carbon nanotubes, and the first lower electrode being a light absorbing layer without an additional light absorbing layer, and wherein sheet resistance of the first lower electrode is in the range of approximately 10 ohm/sq to approximately 100 ohm/sq.

2. The liquid crystal display of claim 1, wherein transmittance of the first lower electrode is in the range of approximately 1% to approximately 60%.

3. The liquid crystal display of claim 1, wherein the first cholesteric liquid crystal is a red cholesteric liquid crystal having a helical pitch reflecting red wavelength light, the second cholesteric liquid crystal is a green cholesteric liquid crystal having a helical pitch reflecting green wavelength light, and the third cholesteric liquid crystal is a blue cholesteric liquid crystal having a helical pitch reflecting blue wavelength light.

4. The liquid crystal display of claim 1, wherein the first upper electrode comprises indium zinc oxide (IZO) or indium tin oxide (ITO).

5. A liquid crystal display, comprising:
a lower substrate and an upper substrate facing each other;
a first lower electrode, a second lower electrode, and a third lower electrode formed on the lower substrate and comprising carbon nanotubes, the first lower electrode, the second lower electrode, and the third lower electrode being a light absorbing layer without an additional light absorbing layer;
a first upper electrode, a second upper electrode, and a third upper electrode formed below the upper substrate;
a first cholesteric liquid crystal interposed between the first lower electrode and the first upper electrode;
a second cholesteric liquid crystal interposed between the second lower electrode and the second upper electrode; and
a third cholesteric liquid crystal interposed between the third lower electrode and the third upper electrode,
wherein sheet resistance of each of the first lower electrode, the second lower electrode, and the third lower electrode is in the range of approximately 10 ohm/sq to approximately 100 ohm/sq.

6. The liquid crystal display of claim 5, wherein the first lower electrode, the second lower electrode, and the third lower electrode are disposed on the same plane based on the lower substrate.

7. The liquid crystal display of claim 5, wherein transmittances of the first lower electrode, the second lower electrode, and the third lower electrode are in the range of approximately 1% to approximately 60%.

8. The liquid crystal display of claim 5, wherein the first cholesteric liquid crystal is a red cholesteric liquid crystal having a helical pitch reflecting red wavelength, the second cholesteric liquid crystal is a green cholesteric liquid crystal having a helical pitch reflecting green wavelength, and the third cholesteric liquid crystal is a blue cholesteric liquid crystal having a helical pitch reflecting blue wavelength light.

9. The liquid crystal display of claim 5, wherein the first upper electrode, the second upper electrode, and the third upper electrode comprises indium zinc oxide (IZO) or indium tin oxide (ITO).

10. A method for making a liquid crystal display, the method comprising:
disposing a plurality of panels in a vertical direction, the panels comprising respective lower substrates and upper substrates facing respectively each other;
forming a plurality of lower electrodes comprising carbon nanotubes on the respective lower substrates and a plurality of upper electrodes below the respective upper substrates, wherein the lowest lower electrode being a light absorbing layer without an additional light absorbing layer; and
interposing a plurality of cholesteric liquid crystals between the respective lower electrodes and the upper electrodes,
wherein each helical pitches of the interposed cholesteric liquid crystals is different, and wherein sheet resistances of the lower electrodes are in the range of approximately 10 ohm/sq to approximately 100 ohm/sq.

11. The method of claim 10, wherein transmittances of the lower electrodes are in the range of approximately 1% to approximately 60%.

12. The method of claim 10, wherein the cholesteric liquid crystals comprise a first cholesteric liquid crystal, a second cholesteric liquid crystal and a third cholesteric liquid crystal, wherein the first cholesteric liquid crystal is a red cholesteric liquid crystal having a helical pitch reflecting red wavelength light, the second cholesteric liquid crystal is a green cholesteric liquid crystal having a helical pitch reflecting green wavelength light, and the third cholesteric liquid crystal is a blue cholesteric liquid crystal having a helical pitch reflecting blue wavelength light.

13. The method of claim 10, wherein the upper electrodes comprise indium zinc oxide (IZO) or indium tin oxide (ITO).

* * * * *